United States Patent
Heavilin et al.

(10) Patent No.: US 8,606,268 B2
(45) Date of Patent: Dec. 10, 2013

(54) METHOD AND SYSTEM FOR REDUCING THE SIZE OF A PAGING ZONE IN A BROADBAND WIRELESS NETWORK

(75) Inventors: Carl F. Heavilin, Milpitas, CA (US); Matthew Warren Heavilin, Overland Park, KS (US)

(73) Assignee: Ericsson AB, Stockholm (SE)

( * ) Notice: Subject to any disclaimer, the term of this patent is extended or adjusted under 35 U.S.C. 154(b) by 296 days.

(21) Appl. No.: 12/996,853

(22) PCT Filed: Jul. 27, 2009

(86) PCT No.: PCT/US2009/051798
§ 371 (c)(1),
(2), (4) Date: Dec. 8, 2010

(87) PCT Pub. No.: WO2010/014523
PCT Pub. Date: Feb. 4, 2010

(65) Prior Publication Data
US 2011/0077014 A1    Mar. 31, 2011

Related U.S. Application Data

(60) Provisional application No. 61/084,716, filed on Jul. 30, 2008.

(51) Int. Cl.
*H04W 4/00* (2009.01)
(52) U.S. Cl.
USPC ........ 455/434; 455/446; 455/458; 455/435.1; 455/406; 455/407; 455/409; 455/459; 455/456.1; 436/332; 436/338
(58) Field of Classification Search
USPC .............. 455/446, 458, 435.1, 406, 407, 409, 455/459, 456.1, 456.2, 436; 370/332, 338
See application file for complete search history.

(56) References Cited

U.S. PATENT DOCUMENTS

| | | | |
|---|---|---|---|
| 5,949,827 A | 9/1999 | DeLuca et al. | |
| 6,195,551 B1 * | 2/2001 | Kim et al. | 455/436 |
| 8,125,937 B2 * | 2/2012 | Akhtar et al. | 370/312 |
| 2006/0025160 A1 * | 2/2006 | Kodali et al. | 455/456.5 |
| 2007/0207811 A1 | 9/2007 | Das et al. | |
| 2008/0285997 A1 * | 11/2008 | Fujita et al. | 399/75 |
| 2009/0003285 A1 * | 1/2009 | Mohanty et al. | 370/332 |
| 2009/0129307 A1 * | 5/2009 | Akhtar et al. | 370/312 |
| 2010/0069062 A1 * | 3/2010 | Horn et al. | 455/434 |

FOREIGN PATENT DOCUMENTS

WO   WO 2006079210 A1 *   8/2006
WO   2007133734 A2   11/2007

OTHER PUBLICATIONS

International Search Report for PCT/US2009/051798 mailed Sep. 23, 2009.

* cited by examiner

*Primary Examiner* — Joseph Arevalo
(74) *Attorney, Agent, or Firm* — Potomac Patent Group PLLC

(57) ABSTRACT

A method reduces a paging zone for a mobile station in a wireless communication system. The wireless communication system includes a plurality of base stations capable of supporting a plurality of application types. A radius of the paging zone is determined. A location update for the mobile station is received. A call setup request for the mobile station is received. The call setup request is associated with an application type. The radius of the paging zone is reduced based on the application type, a speed of the mobile station and an amount of time elapsed since receiving the location update.

17 Claims, 5 Drawing Sheets

METHOD AND SYSTEM FOR REDUCING THE SIZE OF A PAGING ZONE IN A BROADBAND WIRELESS NETWORK

FIELD OF THE INVENTION

The present invention relates generally to wireless communications and more specifically to a method and system for determining a radius of a paging zone in a broadband wireless network based on the mobility characteristics of the mobile device and the application characteristics that triggered the network page.

BACKGROUND OF THE INVENTION

Pages are a critical mobile network resource and are performed using the Downlink Control Channel ("CCH"), or other similar channels performing the same basic functionality in wireless communication networks. Pages are commonly used to locate a specific mobile communication device or mobile station ("MS") prior to connecting a call. Pages require proportionally much more network resources because they are sent to all base stations ("BS") in the paging zone where the network knows the MS is currently located. For networks supporting a variety of packet data services, including but not limited to common web browsing, i.e. best effort ("BE"), or voice-over-IP ("VoIP"), i.e. delay sensitive ("DS") devices, this potential congestion of the CCH due to excess Page messages is especially problematic for DS services which may have to compete for such resources but inherently need faster access speed, e.g., push-to-talk ("PTT") devices, etc. When the MS moves outside the current paging zone, it updates the network with route or location update messages in order to resynchronize the paging zone.

An Evolution Data Optimized ("EVDO") Radio Access Network ("RAN") is a multi-service broadband wireless packet network that supports both DS, e.g., PTT, and BE, e.g., web browsing, applications. Currently, at least some Third Generation communication systems implementing the EVDO telecommunication standard use Distance Based Paging ("DBP") as described above. However, DBP has proved to be insufficient for paging requirements and difficult to optimize. Deployed networks have shown paging zones are much larger than desired for BE applications.

In attempts to solve this problem, simply reducing the size of the paging zone conserves CCH bandwidth, but the Uplink Access Channel ("ACH") capacity is adversely impacted. When the DBP radius is large, the network has to page a large number of BSs to establish contact with the mobile device, which wastes CCH resources. When the DBP radius is small, CCH resources are saved, but the mobile device has to update the network at the boundary of each reduced zone. These more frequent updates make use of the ACH (with greater frequency), which increases contention between competing ACH users, e.g., for setting up calls, and increases network ACH signaling processing load. Because the geometric radius of the paging zone is decreased, not as many BSs are involved in forwarding a page. However, the time required for the MS to actually receive a page may increase because the MS may no longer be located in the smaller paging zone, requiring the system to systematically increase the paging zone. Additionally, the battery life of the MS is reduced as the receive circuitry of the MS must stay in an active condition for a longer period of time waiting to receive the page.

Therefore, what is needed is a system and method for more intelligently determining the radius of a paging zone in a broadband wireless network in relation to the mobility characteristics of the mobile device and the application characteristics that triggered the network page.

SUMMARY OF THE INVENTION

The present invention advantageously provides a method and system for intelligently determining the radius of a paging zone for a particular mobile station, for a particular mobile station and/or a particular call made to a particular mobile station in a wireless communication network in relation to the mobility characteristics of the mobile station and the application characteristics that triggered the network page. Generally, the paging zone radius is reduced based on the type of application requesting a call setup request and mobility characteristics of the mobile station.

In accordance with one embodiment of the present invention, a method is provided for reducing a paging zone for a mobile station in a wireless communication system. The wireless communication system includes a plurality of base stations capable of supporting a plurality of application types. A radius of the paging zone is determined. A location update and a call setup request for the mobile station are received. The call setup request is associated with an application type. The radius of the paging zone is reduced based on the application type, the speed of the mobile station and the amount of time elapsed since receiving the location update.

In accordance with another aspect of the present invention, a network controller is provided for use in a wireless communication system. The wireless communication system includes a plurality of base stations capable of supporting a plurality of application types. The network controller includes a communication interface and a processor. The communication interface is operable to receive a location update for the mobile station and receive a call setup request for the mobile station. The call setup request is associated with an application type. The processor is electrically coupled to the communication interface. The processor is operable to determine a radius of a paging zone for a mobile station and reduce the radius based on the application type, the speed of the mobile station and the amount of time elapsed since receiving the location update.

In accordance with yet another aspect of the present invention, a wireless communication system includes at least one mobile station, a plurality of base stations, and a network controller. Each base station is capable of supporting a plurality of application types for the mobile station. The network controller is electrically connected to the plurality of base stations. The network controller is operable to determine a first radius of a paging zone and receive a location update from the mobile station and a call setup request for the mobile station. The call setup request is associated with an application type. The network controller is further operable to reduce the radius of the paging zone based on the application type, the speed of the mobile station and the amount of time elapsed since receiving the location update.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
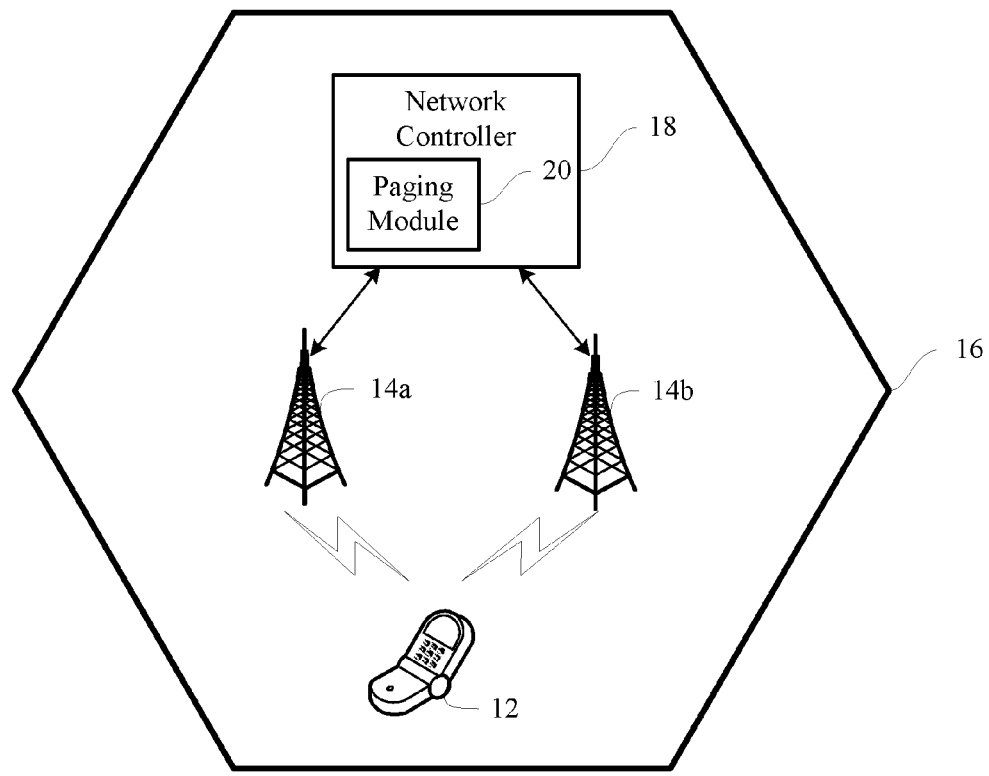
FIG. 1 is a diagram of an exemplary broadband wireless communication system constructed in accordance with the principles of the present invention.

Before describing in detail exemplary embodiments that are in accordance with the present invention, it is noted that the embodiments reside primarily in combinations of apparatus components and processing steps related to determining an efficient paging radius for a wireless communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously determines a paging zone radius for a mobile station ("MS") based on the estimated speed at which the MS is moving and the application type requesting setup. A default paging zone radius is scaled by a multiplying function for the mobility characteristics of the MS, the characteristics of the requesting application type, or both requesting application type. The multiplying function is determined by the time interval between location update messages from the MS.

Referring now to the drawing figures in which like reference designators refer to like elements, there is shown in FIG. 1, an exemplary broadband wireless communication system 10 is provided in accordance with the principles of the present invention. The system 10 includes at least one mobile communication device 12 (one shown), also known as a mobile station ("MS"), which communicates with other wired and/or wireless communication devices (not shown) through one or more base stations ("BS") 14a, 14b (referenced collectively as base station 14). One or more base stations 14 may be included in one cell area 16 of the communication system 10.

The operation and traffic coordination of each cell 16 is conducted by a wireless network controller 18. The network controller 18 may be collocated with the base station 14 or located at a centralized location. The network controller 18 includes a paging module 20 which performs a paging operation for a mobile station 12 upon request and determines an efficient radius of a paging zone for each mobile station 12. Operation of the paging module 20 is discussed in greater detail below.

According to one embodiment, the invention is directed to estimating a paging zone radius for a specific mobile station 12 depending upon an elapsed time interval between location updates by the mobile station 12. It should be appreciated that, although the invention is described with reference to a communication network 10 employing an Evolution-Data Optimized ("EV-DO") standard, the principles of the invention may be adapted by one of skill in the art for use on any broadband network.

According to one embodiment, the mobile station 12 may include a wide range of portable electronic devices, including but not limited to mobile phones, personal data assistants ("PDA") and similar devices, which use the various communication technologies such as advanced mobile phone system ("AMPS"), time division multiple access ("TDMA"), code division multiple access ("CDMA"), global system for mobile communications ("GSM"), general packet radio service ("GPRS"), 1x evolution-data optimized (abbreviated as "EV-DO" or "1xEV-DO"), Worldwide Interoperability for Microwave Access ("WiMAX"), universal mobile telecommunications system ("UMTS"), and 3GPP Long Term Evolution ("LTE"). The mobile station 12 also includes the hardware and software suitable to support the functions needed to engage in wireless communication with base stations 14. Such hardware can include a receiver, transmitter, central processing unit, storage in the form of volatile and nonvolatile memory, and input/output devices, among other hardware, each element of which is in electrical communication with each other.

According to one embodiment, the network controller 18 may include a central processing unit ("CPU"), communication interface, I/O devices and storage, such as volatile and nonvolatile memory, to implement the functions described herein.

According to one embodiment of the invention, the base station 14 may include a server, transceivers for transmitting and receiving radio signals, and antennas. The base station 14 may also include two-way transceivers that broadcast data into the surrounding environment and typically act as mediators between wired and wireless networks. The transceivers include circuitry to transmit and receive radio signals, antennas, and equipment for encrypting and decrypting communications. The base station 14 may also include a CPU, I/O devices and storage, such as volatile and nonvolatile memory, each element of which is in electrical communication with each other, to implement the functions described herein.

The base station 14 performs several functions, including radio resource management, such as radio bearer control, radio admission control, connection mobility control, dynamic allocation of resources, e.g., scheduling, to mobile stations 12 in both uplink and downlink; IP header compression and encryption of user data streams; scheduling and transmission of paging messages that originate from the network controller 18; scheduling and transmission of broadcast information that originate from the network controller 18; and measurement and measurement reporting configurations for mobility and scheduling, among performing other functions.

According to one embodiment, the mobile station 12 may provide context information to the base station 14, including a user profile, user history, a network location, mobile terminal location, network capabilities, network services, charging models, user settings, application settings, hardware capabilities of the mobile station 12, current required services, and radio measurement, among other mobile station context information. Additionally, mobile station context information may include station status information, including a battery level or an interface status, among other terminal status information. Furthermore, the mobile station 12 may provide network information including network status information and network load information, among other network information.

Figure 2:
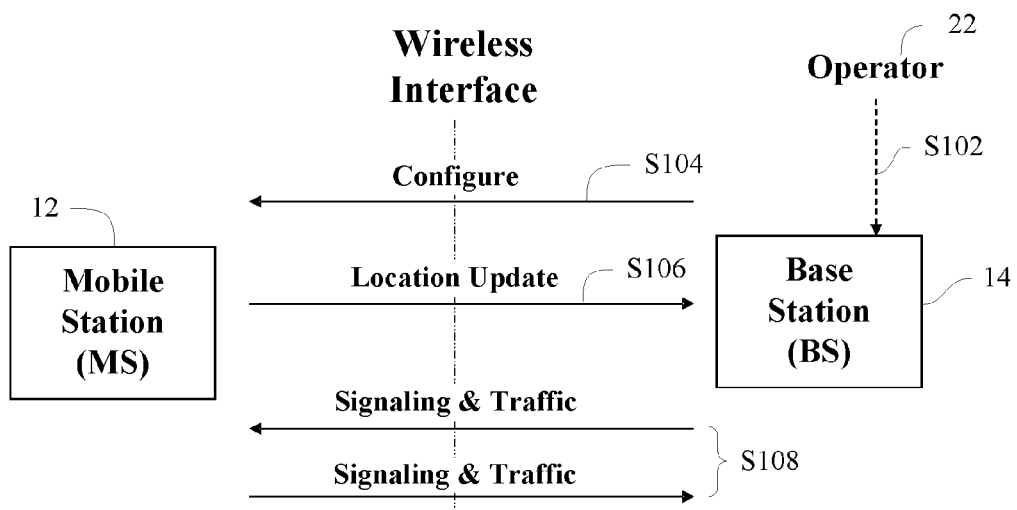
FIG. 2 is a flow diagram of an exemplary communication process according to the principles of the present invention.

Referring now to FIG. 2, a flow diagram of an exemplary communication process between an MS 12 and a BS 14 is provided. An operator 22 enters a default configuration for the MS 12 into a BS 14 (step S102). The default configuration includes a default Distance Based Paging ("DBP") paging zone radius ("Radius$_{DBP}$") for the MS 12 and a multiplier function ("$f(t)$") for each application type supported. The reduced paging zone radius ("R(t)") is determined by multiplying Radius$_{DBP}$ by $f(t)$.

The BS 14 sends the default configuration to the MS 12 (step S104). When the MS 12 moves beyond the default paging zone radius, it sends a location update back to the BS 14 (step S106). The BS 14 uses the information in the location update to position a new paging zone, and uses the average time interval between location updates and the application type to determine the radius of the new paging zone. Normal signaling and traffic, e.g., phone calls, text messaging, web browsing, video downloading, FTP data transfer, etc., continue between the MS 12 and the BS 14 (step S108).

Figure 3:
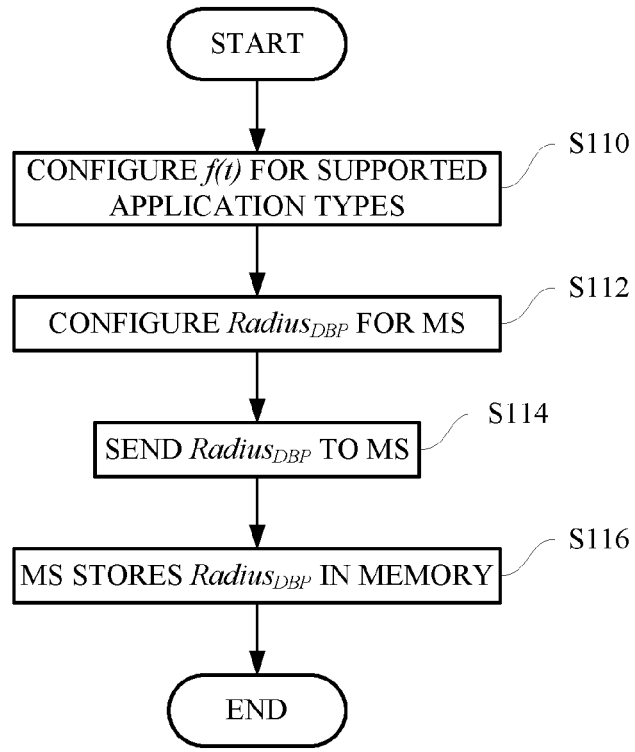
FIG. 3 is a flow chart of an exemplary paging radius initialization process according to the principles of the present invention.

Referring now to FIG. 3, a flowchart is provided that describes exemplary steps performed by the paging module 20 of the network controller 18 to initialize the paging zone radius in an MS 12. The process begins by configuring a multiplier function $f(t)$ for each supported application type (step S110). For example, supported application types may include, but are not limited to, Delay Sensitive ("DS") applications such as Push-to-Talk ("PTT"), conversational voice applications, low priority messaging, and web browsing. The tolerance level of each application type for withstanding delay may differ, thus the multiplier function will differ accordingly.

Figure 4:
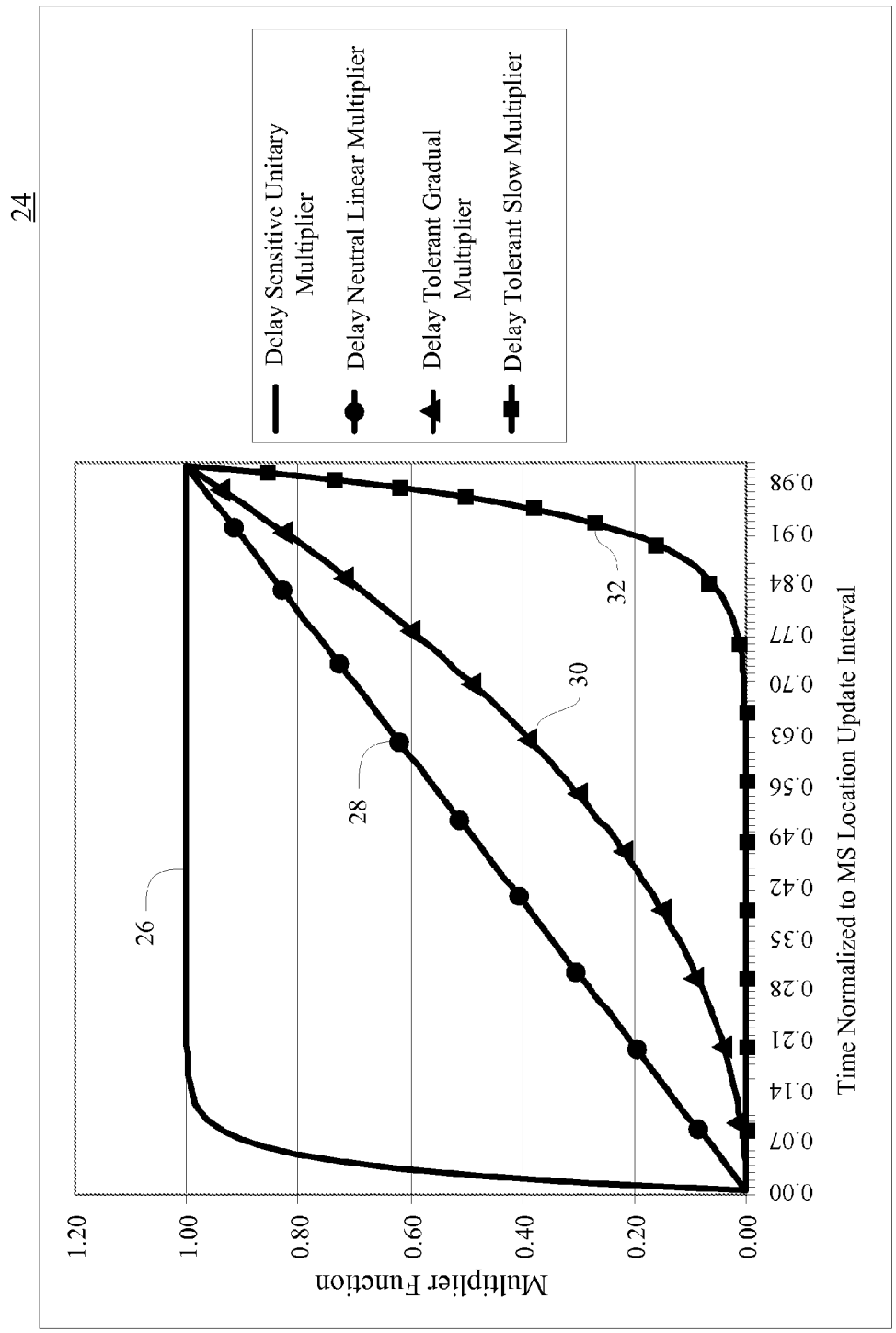
FIG. 4 is a graph illustrating an exemplary paging zone multiplier function according to the principles of the present invention.

FIG. 4 provides a graph 24 that shows exemplary multiplier functions for four different application types normalized to MS location update intervals. For example, an application that is very sensitive to delay, almost to the point of being delay intolerant, is PTT. For PTT applications, one embodiment of the present application uses a unitary multiplier function 26 of the form $$f(t)=(1-(1-t)^N) \qquad (1),$$

where t>0 and t≤1 is the normalized elapsed time since the last MS location update and N is a configurable speeding factor for ensuring a larger paging zone for these applications. As seen from graph 24, the unitary multiplier function 26 begins very small so that if the MS 12 had been active in the last few seconds, the paging zone stays small. However, after the initial seconds, the multiplier function 26 ramps up to 1 quickly to ensure that the MS 12 is paged everywhere in the full paging zone. The unitary multiplier function 26 may be applied to each activation of the PTT or in a blanket fashion to all users who subscribe to PTT applications.

For applications that are less delay sensitive, more moderate multiplier functions may be used. For example, for delay neutral applications such as conversational voice, a simple linear multiplier function 28 may be used, such as $$f(t)=t \qquad (2).$$

As with the unitary multiplier function 26, the linear multiplier function may be applied to each application of the voice service, or for all users who subscribe to a voice service.

For applications that are more delay tolerant, such as low priority messaging, a gradual multiplier function 30 may be used, such as $$f(t)=t^2 \qquad (3),$$

where t>0 and t≤1 is the normalized elapsed time since the last MS location update. For applications that are very delay tolerant, such as web browsing, a slow multiplier function 32 may be used, such as $$f(t)=t^N \qquad (4),$$

where N is a configurable speeding factor of a smaller paging zone for each application. This multiplier function 32 may be applied to each activation of web browsing, or for all users who subscribe to web browsing applications where paging is needed.

Returning to FIG. 3, a default paging radius, Radius$_{DBP}$, is configured for the MS 12 on the BS 14 (step S112) and sent to the MS 12 (step S114), where the MS 12 stores the default paging radius in memory (step S116). The actual paging radius for a specific application page is the default paging radius multiplied by the multiplier function associated with the application type.

Figure 5:
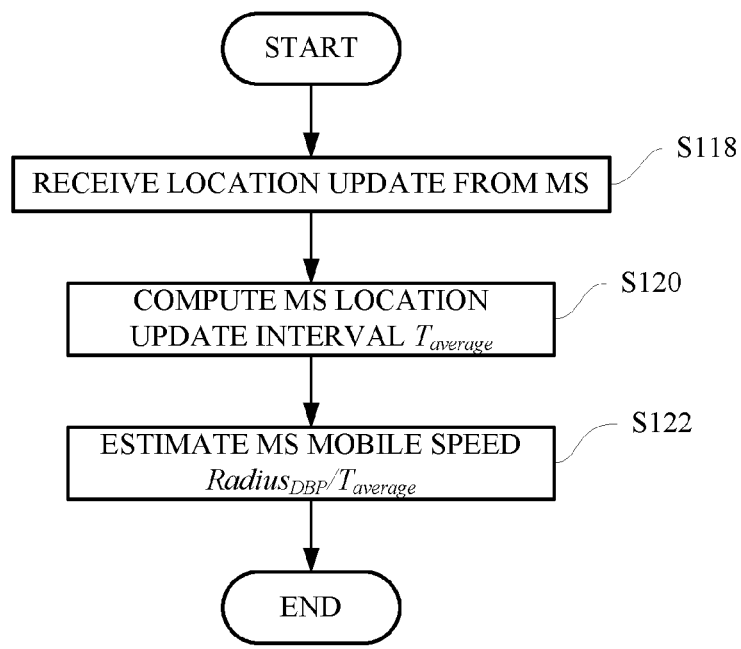
FIG. 5 is a flow chart of an exemplary paging radius parameter updating process according to the principles of the present invention.

Referring now to FIG. 5, a flowchart is provided that describes exemplary steps to update parameters used to calculate the paging zone radius in an MS 12. The process begins when an MS 12 has moved out of the paging zone. The BS 14 receives a location update from the MS 12 (step S118) and computes the average time interval ("T$_{average}$") between MS location updates (step S120) and the estimated speed of the MS 12 ("Speed$_{MS}$") (step S122), where Speed$_{MS}$=Radius$_{DBP}$/T$_{average}$.

Figure 6:
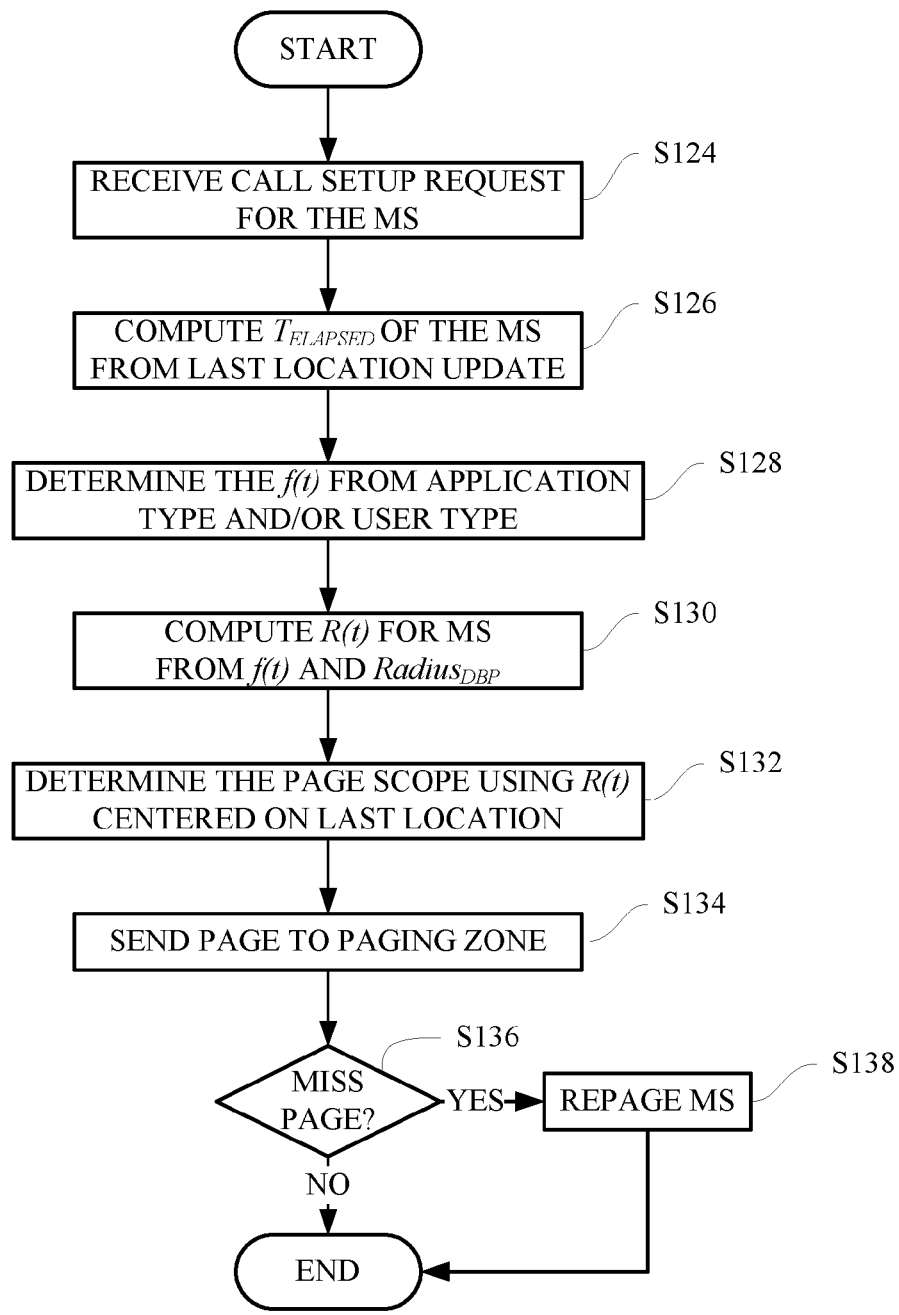
FIG. 6 is a flow chart of an exemplary paging process according to the principles of the present invention.

Referring now to FIG. 6, a flowchart is provided that describes exemplary steps performed by the paging module 20 when paging an MS 12. The BS 14 receives a call setup request for the MS 12 from an application (step S124). The paging module 20 computes the elapsed time since the last MS location update ("T$_{elapsed}$") (step S126). The paging module 20 determines which $f(t)$ to use according to the type of application requesting the call setup (step S128). The paging module 20 computes R(t) at the normalized time, t=T$_{normalized}$, by multiplying Radius$_{DPB}$ by $f(t)$ (step S130). The paging module 20 determines the scope of the paging zone represented as a circle of radius R(t) centered at the last MS location update (step S132). The network controller 18 sends the page to the MS 12 using the CCH of all the BSs 14 in the reduced paging zone (step S134). If the first page misses (step S136), the BSs 14 repeat the page one time (step S138). In this manner the present invention may reduce the size of the paging zone by an estimated factor of between 10-100. It should be noted that the paging module 20 may repeat this page one or more times, and each repeat page may be over a larger paging zone.

Figure 7:
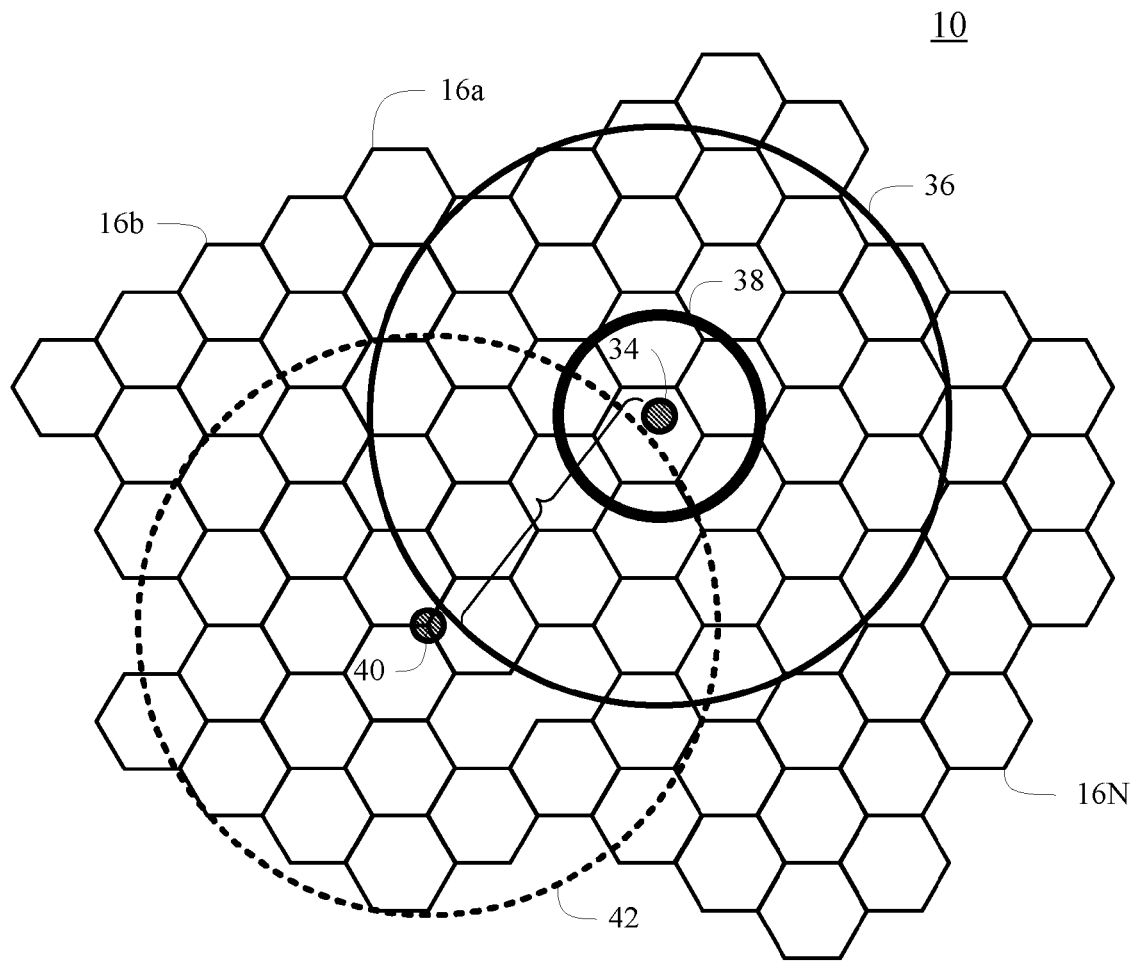
FIG. 7 is a diagram of an exemplary broadband wireless communication system including paging zones constructed in accordance with the principles of the present invention.

Referring now to FIG. 7, a geographic diagram of an exemplary wireless communication system 10 illustrates paging zones constructed according to the principles of the present invention. The wireless communication system 10 includes a plurality of cells 16a, 16b, . . . , 16n (referenced collectively as cell 16). A mobile station MS 12 is located at a first position 34. The default paging zone 36 is centered around the MS's position 34, with a radius of Radius$_{DBP}$. After applying the method described above, the new paging zone 38 is reduced to a circle having a radius R(t). When the MS 12 moves outside the of the paging zone 36, it sends a location update to the nearest BS 14, which then moves the center of the default paging zone to the new position 40, creating a new default paging zone 42. It should be noted that the location update from the MS 12 is governed by the default Radius$_{DBP}$ value that was configured at the MS 12 initially. Therefore, the location update is only sent when the MS 12 moves beyond the default/original paging zone.

A typical combination of hardware and software could be a specialized computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for reducing a paging zone for a mobile station in a wireless communication system, the wireless communication system including a plurality of base stations capable of supporting a plurality of application types, the method comprising:
   determining a radius of the paging zone;
   receiving a location update for the mobile station;
   receiving a call setup request for the mobile station, the call setup request associated with an application type; and
   reducing the radius of the paging zone,
   wherein the step of reducing the radius of the paging zone is determined by the following parameters: the application type, a speed of the mobile station and an amount of time elapsed since receiving the location update,
   wherein the step of reducing the radius of the paging zone further comprises:
   assigning a multiplier function to each supported application type, the multiplier function a function of normalized time;
   multiplying the radius of the paging zone by the multiplier function assigned to the application type associated with the call setup request; and
   determining the reduced radius at the time elapsed since receiving the location update.

2. The method of claim 1, wherein the supported application types include delay sensitive applications, delay neutral applications, and delay tolerant applications.

3. The method of claim 1, wherein the multiplier function includes at least one of a unitary multiplier function, a linear multiplier function, a gradual multiplier function and a slow multiplier function.

4. The method of claim 3, wherein a delay sensitive application is assigned a unitary multiplier function.

5. The method of claim 3, wherein a delay neutral application is assigned one of a linear multiplier function and a slow multiplier function.

6. The method of claim 3, wherein a delay tolerant application is assigned a slow multiplier function.

7. The method of claim 1, wherein time is normalized by an average amount of time elapsed between location updates.

8. The method of claim 1, wherein the location update is received from the mobile station responsive to the mobile station moving outside of the paging zone.

9. The method of claim 1, further comprising sending a page to the mobile station using all base stations located within the reduced paging zone.

10. A network controller for use in a wireless communication system, the wireless communication system including a plurality of base stations capable of supporting a plurality of application types, the network controller comprising:
    a communication interface operable to:
    receive a location update for the mobile station; and
    receive a call setup request for the mobile station, the call setup request associated with an application type; and
    a processor electrically coupled to the communication interface, the processor operable to:
    determine a radius of a paging zone for a mobile station; and
    reduce the radius of the paging zone,
    wherein the step of reducing the radius of the paging zone is determined by the following parameters: the application type, a speed of the mobile station and an amount of time elapsed since receiving the location update,
    wherein the processor reduces the radius of the paging zone by:
    assigning a multiplier function to each supported application type, the multiplier function a function of normalized time;
    multiplying the radius of the paging zone by the multiplier function assigned to the application type associated with the call setup request; and
    determining the reduced radius at the time elapsed since receiving the location update.

11. The network controller of claim 10, wherein a delay sensitive application is assigned a unitary multiplier function.

12. The network controller of claim 10, wherein a delay neutral application is assigned one of a linear multiplier function and a slow multiplier function.

13. The network controller of claim 10, wherein a delay tolerant application is assigned a slow multiplier function.

14. The network controller of claim 10, wherein time is normalized by an average amount of time elapsed between location updates.

15. The network controller of claim 10, wherein the communication interface receives the location update for the mobile station responsive to the mobile station moving outside of the paging zone.

16. The network controller of claim 10, wherein the communication interface is further operable to send a page to the mobile station using all base stations located within the reduced paging zone.

17. A wireless communication system comprising:
    at least one mobile station;
    a plurality of base stations, each base station capable of supporting a plurality of application types for the at least one mobile station; and
    a network controller electrically connected to the plurality of base stations, the network controller operable to:
    determine a first radius of a paging zone;
    receive a location update from the mobile station;
    receive a call setup request for the mobile station, the call setup request associated with an application type; and
    reduce the radius of the paging zone,
    wherein the step of reducing the radius of the paging zone is determined by the following parameters: the application type, a speed of the mobile station and an amount of time elapsed since receiving the location update, wherein the network controller reduces the radius of the paging zone by:

assigning a multiplier function to each supported application type, the multiplier function a function of normalized time;

multiplying the radius of the paging zone by the multiplier function assigned to the application type associated with the call setup request; and determining the reduced radius at the time elapsed since receiving the location update.

* * * * *